United States Patent
Kasuga et al.

[11] Patent Number: 6,068,330
[45] Date of Patent: May 30, 2000

[54] FRAMEWORK OF AN AUTOMOBILE BODY

[75] Inventors: Tatsuo Kasuga; Hideaki Takaishi, both of Saitama, Japan

[73] Assignee: Honda Giken Kogyo Kabushiki Kaisha, Tokyo, Japan

[21] Appl. No.: 09/236,231

[22] Filed: Jan. 22, 1999

[30] Foreign Application Priority Data

| Jan. 22, 1998 | [JP] | Japan | 10-010283 |
| Jan. 22, 1998 | [JP] | Japan | 10-010292 |
| Jan. 22, 1998 | [JP] | Japan | 10-010294 |

[51] Int. Cl.$^7$ .................................................. B60J 7/00
[52] U.S. Cl. ........................ 296/189; 296/188; 296/205; 280/784; 280/789; 188/377; 52/735.1
[58] Field of Search ..................... 296/189, 187, 296/188, 203.02, 205, 194, 204; 293/133; 188/377, 376, 371; 267/139; 52/100, 720.1, 120.3, 735.1, 736.1; 280/784, 798

[56] References Cited

U.S. PATENT DOCUMENTS

| 4,031,978 | 6/1977 | Taylor | 293/133 X |
| 4,058,188 | 11/1977 | Vrillon | 188/377 |
| 5,462,144 | 10/1995 | Guradiola et al. | 188/377 |
| 5,660,116 | 8/1997 | Dannawi et al. | 105/392.5 |
| 5,681,057 | 10/1997 | Whirley | 280/784 |
| 5,715,757 | 2/1998 | Dannawi et al. | 105/392.5 |
| 5,868,457 | 2/1999 | Kitagawa | 296/188 |
| 5,913,565 | 6/1999 | Watanabe | 296/189 |

*Primary Examiner*—D. Glenn Dayoan
*Assistant Examiner*—Patricia Engle
*Attorney, Agent, or Firm*—Arent Fox Kintner; Plotkin & Kahn, PLLC

[57] ABSTRACT

A lightweight metal automobile framework having a hollow, impact-absorbing member, wherein the impact-absorbing member absorbs any impact by axial plastic deformation and has inner ribs passing through a center axis thereof. The impact-absorbing member may also have an axial end face partially removed to lessen an area on which a load is imposed at an instant of impact, thereby raising the average stress of the impact and lowering peak deceleration. Also, automobile framework members forming a front-end portion of the automobile framework may be detachably coupled to the automobile framework.

13 Claims, 4 Drawing Sheets

FRAMEWORK OF AN AUTOMOBILE BODY

BACKGROUND OF THE INVENTION

1. Field of the Invention

The present invention relates to an automobile body framework formed of a lightweight metal material, and also to lightweight metal framework members forming a front-end portion of the automobile framework.

2. Description of the Related Art

Aluminum is a metal that has high moldability and a strength equivalent to that of steel, yet is light in weight. Aluminum also has excellent impact energy absorption during deformation. Thus, in recent years, attention has been focused on using aluminum as the framework material of automobiles.

If the kinetic energy of an automobile framework at impact is balanced with an axial stress of an extrusion, then in order to generate a constant stress over an entire stroke, the form of the deformation needs to remain constant. That is, if during an impact, compressive deformation changes to bending deformation, the result is an abrupt change in stress. It is desirable to avoid such a situation.

In order to receive all axially imposed stress as compressive stress, a predetermined stable compression load needs to be generated in a impact absorption member. If the cross-sectional area of the impact absorption member is simply set, it is difficult to provide a stable deformation. Through experiment, the inventors have found that providing compressive deformation using, for example, a hollow, polygonal impact absorption member, results in a constant correlation between the length L of one side of the hollow material and its plate thickness t. However, if an attempt is made to set the bending rigidity of the framework based on this correlation, the length L becomes too large, lowering the automobile's space efficiency.

Further, although the lightweight metal material has a narrow elastic region and a high damping force caused by plastic deformation, it is similar to other metal materials in that the stress at the yield point is exceptionally high as compared with the average stress in the plastic region (about 1.5–2.0 times). For example, to absorb collision energy by compression deformation of an extrusion having a constant cross-section, the presence of a large peak at deceleration is not avoided with a conventional framework. That is, formerly, if the stress at the time of impact is lowered so that deceleration is endurable by a passenger, there is insufficient energy absorption due to lowered average stress. In contrast, if the damping force in the plastic region is raised, the peak deceleration becomes too large.

Moreover, once the aluminum material becomes plastically deformed, it is substantially impossible to restore the material to its original form. For example, if a portion of the material becomes deformed because of a small collision, an easy repair (e.g., by heating, striking, etc., as done with steel) cannot be made. Thus, a repair must be made on a large scale, and resulting in expensive repair costs.

SUMMARY OF THE INVENTION

It is an object of the present invention to overcome the above-mentioned problems of the related automobile framework. More specifically, it is one object of the invention to provide a framework of an automobile body made of a lightweight metal material, designed to be able to generate an intended compressive stress without having cross-sectional outer dimensions that are too large.

Accordingly, there is provided a lightweight metal automobile framework having a hollow, impact-absorbing member, wherein the impact-absorbing member absorbs any impact by axial plastic deformation and has inner ribs passing through a center axis thereof. Thus, if the relationship between the length L of one side of the impact absorption member and its plate thickness t is appropriately set, then a cross-sectional area capable of providing an appropriate compression strength can be obtained. The result is that compression strength and bending rigidity can be made highly compatible with one other, without enlarging the outer dimensions of the impact absorption member.

It is a further object of the present invention to provide a lightweight, metal framework that is designed to lower peak deceleration. That is, the framework causes the stress at the time of impact to approach the average stress in the plastic region during a compression deformation process.

Accordingly, there is provided a lightweight metal automobile framework having a hollow, impact-absorbing member, wherein the impact-absorbing member absorbs any impact by axial plastic deformation and has an axial end face partially removed to lessen an area on which a load is imposed at an instant of impact. In doing so, the compressive stress per unit area occurring at the instant at which a collision against the hollow shock absorption member occurs rises, thus lowering the initial compression load and the peak deceleration value. Once deformation is started, it becomes a trigger for further deformation, so that the average stress is held high as compared with the degree of lowering the initial compression load.

It is yet a further object of the present invention to provide framework members making up a front-end portion of an automobile framework designed so as to be able to be repaired easily after deformation due to a collision, etc.

Accordingly, there are provided automobile framework members forming a front-end portion of an automobile framework and being made of a lightweight metal, wherein the framework members are detachably coupled together.

If the plurality of framework members, namely, a front bulkhead, the front-end portions of side members, and the like are manufactured as discrete parts and are bolted, for example, to the main portion of the framework, the deformed portions can be easily replaced, without having to replace non-deformed portions. As a result, the number of repair steps, and accordingly the repair costs, may be decreased.

DETAILED DESCRIPTION OF THE INVENTION

The present invention will now be described with reference to the accompanying drawings.

Figure 1A:
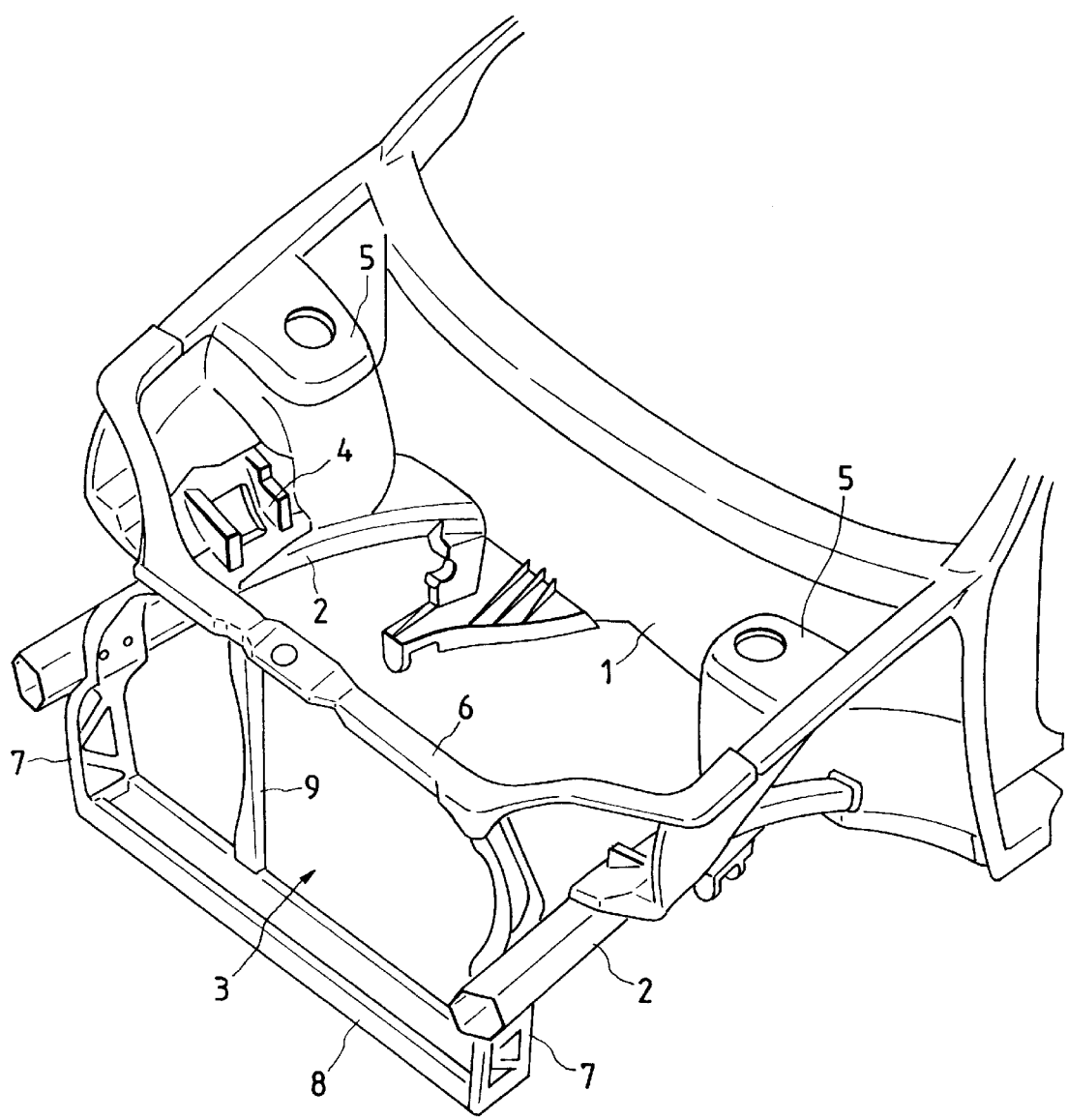
FIG. 1A is a perspective view showing the front of a framework of an automobile body incorporating the present invention.

FIG. 1A shows the front of a framework of an automobile body incorporating the present invention. The framework is formed by joining various aluminum alloy members. Specifically, the framework comprises a pair of side frames 2 joined at rear ends to lower portions of a front dashboard 1, and joined at front ends to a front bulkhead 3.

Each of the side frames 2 is hollow, has a hexagon-like outer shape, and is curved in a concave, downward direction so as to avoid interference with a front axle. Engine mount brackets 4, strut towers 5, and the like are joined to the side frames 2 at appropriate places. A front bumper (not shown) is attached to the front ends of the side frames 2.

Figure 1B:
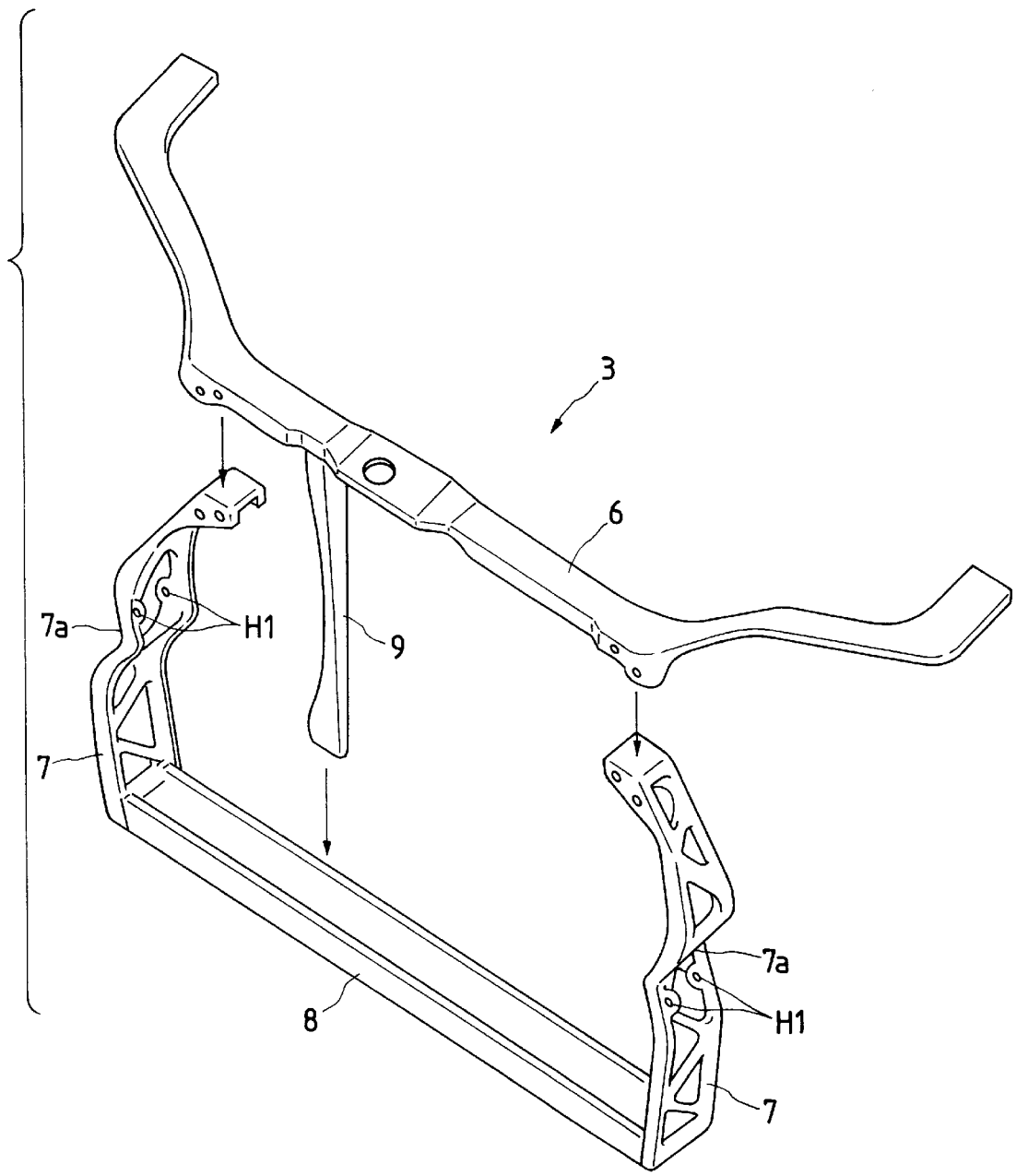
FIG. 1B is an exploded perspective view of a front bulkhead.

The front bulkhead 3 consists of a press-molded upper member 6, a pair of die-caste side members 7, and an extruded lower member 8. The right and left ends of the lower member 8 are welded to the lower ends of the respective side members 7, and the upper ends of both of the side members 7 are joined by bolts (not shown) to the upper member 6, to thereby form a subassembly. Facing intermediate portions of the upper member 6 and the lower member 7 are coupled by a press-molded longitudinal member 9. The vertical portions of both of the side members 7 are joined to the side frame 2 by bolts, so that the front bulkhead 3 can be repeatedly attached to and detached from the side frame 2. As shown in FIG. 1B, depressions 7a corresponding to the hexagonal contours of both of the side frames 2 and holes H1 for allowing bolts to loosely pass therethrough are made in the vertical portions of both of the side members 7.

Figure 2:
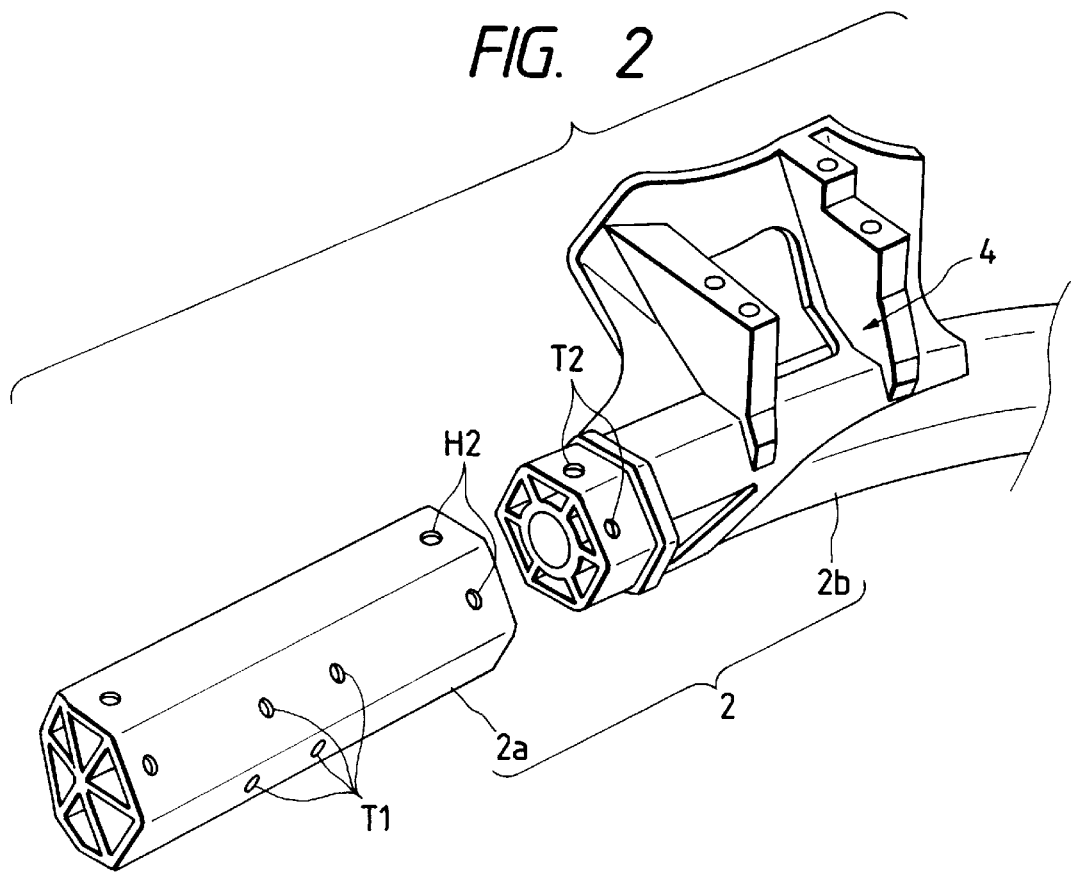
FIG. 2 is an exploded perspective view of a front-end portion of a side framework.

Turning to FIG. 2, each of the side frames 2 comprises a linear portion 2a, to which the front bulkhead 3 is joined, and a bent portion 2b, which is joined directly to the front dashboard 1. The linear portion 2a and the bent portion 2b are joined together by first fittingly connecting the rear end of the linear portion 2a with the front end of the bent portion 2b. Bolts (not shown) are then screwed through bolt insertion holes H2 formed in the rear end of the linear portion 2a, and subsequently into female screw holes T2 formed in the front end of the bent portion 2b. Only the linear portion 2a of the side frame 2 is repeatedly detachable.

Further, the upper member 6 of the front bulkhead 3 of the framework can be detached solely, thereby enhancing workability during engine attachment/detachment time.

Figure 3:
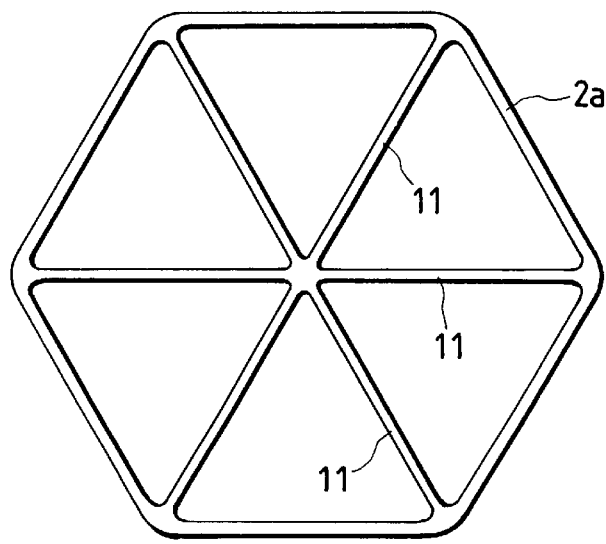
FIG. 3 is a longitudinal sectional view of the front-end portion of the side framework.

As shown in FIG. 3, the linear portion 2a is hexagonal in cross section. Ribs 11 diagonally connect the inner faces of the linear portion 2a, and pass through the center axis in the hollow. The ribs 11 enlarge the relative sectional area, without enlarging the outer dimensions or plate thickness of the linear portion 2a more than absolutely necessary. Thus, appropriate compression strength can be achieved, without impairing bending rigidity of the framework. Further, stability of the compressive stress over the entire stroke can be enhanced.

A particularly good result can be achieved by setting the relationship between the length L of one side of a hexagon on the plane orthogonal to the axis of the linear portion 2a and thickness t to be as follows:

$$t < 0.5 \, L$$

Figure 4:
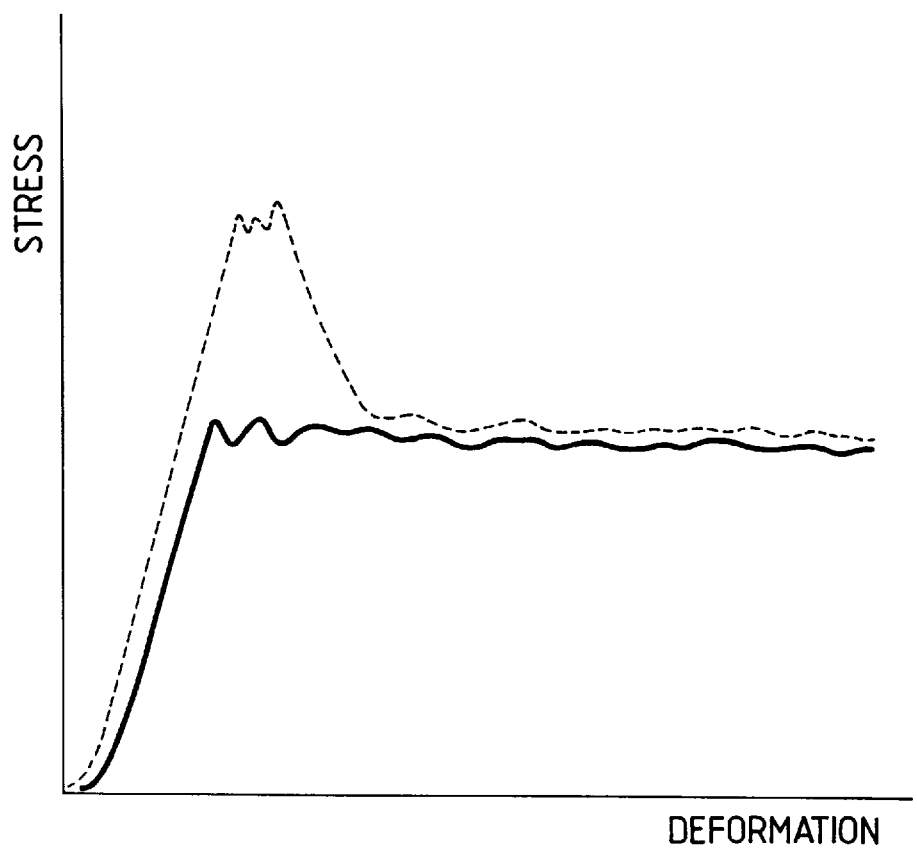
FIG. 4 is a compressive stress characteristic curve.

In general, the compressive stress characteristic of metals at a time of impact is exceptionally high as compared with the compressive stress characteristic in the plastic region, as indicated by the dotted line in FIG. 4. Thus, if the stress at the yield point is lowered so as to set the deceleration to be endurable for a passenger, there is insufficient energy absorption. In contrast, if the plastic region stress for providing a sufficient damping force is lowered, the peak stress becomes too large.

Figure 5:
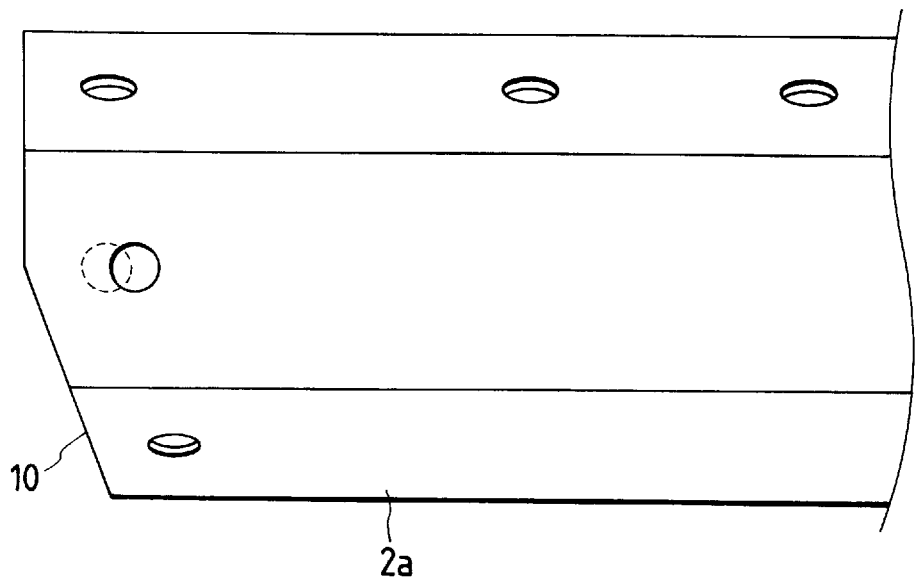
FIG. 5 is a plan view of the front-end portion of the side framework.

This problem can be overcome by setting the damping force in the plastic region to a predetermined value, and preventing the peak value of the deceleration from becoming too large. This may be accomplished by forming a slant cutaway portion 10 in the tip of the linear portion 2a of each side frame 2, as shown in FIG. 5. The slant cutaway portion 10 lessens the area on which an initial load is imposed during a head-on collision. The compressive stress per unit area occurring at the instant a collision against the tip of the hollow linear portion 2a occurs is raised, the initial compression load is relatively lowered, and thus the peak value of deceleration is lowered. Once deformation is started, further deformation is triggered, and thus the stress at the moment of impact is lowered. Therefore, the strength for providing an intended damping force can be provided, without lowering average stress in the plastic region (see the solid line in FIG. 4).

Thus, according to the present invention, an intended compression strength can be set without enlarging the outer cross-sectional dimension of the linear portion 2a. It is thereby possible to generate a constant stress over an entire stroke using a limited amount of space. A further advantage is that the setting accuracy of the impact absorption characteristic is enhanced.

Further, when the average stress in the plastic region is set to a desired value, the stress at the moment of impact can be made to approach the average stress so as to lower the peak deceleration value. As a result, a large advantage of buffering collision shock can be obtained. Also, if an outer portion of the linear portion 2a is slantingly cut away in the car width direction, the linear portion 2a can fit within the curved corner of a bumper.

Once the aluminum material becomes plastically deformed, it is substantially impossible to restore the material to its original form, as previously described in the related art section. When aluminum framework members are welded to each other as with steel framework members for example, even if only the tip of the side frame 2 becomes deformed as a result of a light collision, a repair must be made on an extremely large scale. According to the invention, this problem is overcome by joining the framework members to each other by repeatedly detachable joint means (e.g., by bolts, nuts), so that deformed framework members can be easily and less expensively replaced.

Thus, according to the present invention, aluminum material may be used to provide a high impact absorption characteristic while simultaneously enhancing ease of repair following deformation. Moreover, residual stress caused by heat distortion, as by welding, need not be considered. If tolerance of each framework member during the manufacturing is made to be large, necessary accuracy can be provided during assembly by making loose bolt insertion holes. Thus, the total cost of framework manufacturing may be reduced.

While only certain embodiments of the invention have been specifically described herein, it will be apparent that numerous modifications may be made thereto without departing from the spirit and scope of the invention.

The entire disclosure of each and every foreign patent application from which the benefit of foreign priority has been claimed in the present application is incorporated herein by reference, as if fully set forth.

What is claimed is:

1. A lightweight metal automobile framework comprising an impact-absorbing member, the impact-absorbing member being hollow, having inner ribs passing through a center axis thereof, and a uniform hexagonal shape in a plane transverse to the center axis of the impact-absorbing member, wherein the impact-absorbing member absorbs any impact by axial deformation.

2. The lightweight metal automobile framework according to claim 1, wherein the impact-absorbing member comprises a linear portion and a bent portion, the linear portion having at least one bolt insertion hole formed in front and rear ends of the linear portion, the bent portion having at least one female screw hole formed in front and rear ends of the bent portion.

3. The lightweight metal automobile framework according to claim 2, wherein the rear end of the linear portion is detachably connectable to the front end of the bent portion.

4. The lightweight metal automobile framework according to claim 2, wherein a relationship between a length L of a side of a hexagon on the plane transverse to the center axis of the linear portion of the impact-absorbing member and a thickness t of the impact-absorbing member is defined by $t<0.5L$ to achieve a desired compression strength and enhance a stability of a compressive stress.

5. The lightweight metal automobile framework according to claim 2, wherein a plurality of inner ribs diagonally connect inner faces of the linear portion relative to the center axis, thereby enlarging a relative sectional area of the impact-absorbing member.

6. A lightweight metal automobile framework comprising an impact-absorbing member, the impact-absorbing member being hollow and having a plurality of inner ribs diagonally connect inner faces of the impact-absorbing member relative to a center axis of the impact-absorbing member, wherein the impact-absorbing member absorbs any impact by axial plastic deformation and has a partially removed axial end face in a plane that is oblique to the center axis to lessen an area on which a load is imposed to the automobile framework at an instant of impact.

7. The lightweight metal automobile framework according to claim 6, wherein the impact-absorbing member comprises a linear portion and a bent portion, the linear portion having at least one bolt insertion hole formed in front and rear ends of the linear portion, the bent portion having at least one female screw hole formed in front and rear ends of the bent portion.

8. The lightweight metal automobile framework according to claim 6, wherein the rear end of the linear portion is detachably connectable to the front end of the bent portion.

9. The lightweight metal automobile framework according to claim 6, wherein a relationship between a length L of a side of a hexagon on the plane transverse to the center axis of the linear portion of the impact-absorbing member and a thickness t of the impact-absorbing member is defined by $t<0.5L$ to achieve a desired compression strength and enhance a stability of a compressive stress.

10. Automobile framework members forming a front-end portion of an automobile framework and being made of a lightweight metal, the automobile framework members comprising an impact-absorbing member being one of hollow with a hexagonal shape in a plane transverse to a center axis of the impact-absorbing member and hollow with a partially removed axial end face that lessens an area on which a load is imposed to the automobile framework at an instant of impact, the impact-absorbing member includes a linear portion and a bent portion, the linear portion having at least one bolt insertion hole formed in front and rear ends of the linear portion, the bent portion having at least one female screw hole formed in front and rear ends of the bent portion wherein the linear and bent portions are detachably coupled to the automobile framework.

11. The lightweight metal automobile framework according to claim 10, wherein the rear end of the linear portion is detachably connectable to the front end of the bent portion.

12. The lightweight metal automobile framework according to claim 10, wherein a relationship between a length L of a side of a hexagon on the plane transverse to the center axis of the linear portion of the impact-absorbing member and a thickness t of the impact-absorbing member is defined by $t<0.5L$ to achieve a desired compression strength and enhance a stability of a compressive stress.

13. The lightweight metal automobile framework according to claim 10, wherein a plurality of inner ribs diagonally connect inner faces of the linear portion relative to the center axis, thereby enlarging a relative sectional area of the impact-absorbing member.

* * * * *